United States Patent
Schmidt et al.

(10) Patent No.: US 10,587,678 B2
(45) Date of Patent: Mar. 10, 2020

(54) PRODUCTION SERVER MANAGEMENT USING A STORAGE ARRAY

(71) Applicant: Dell Products, L.P., Round Rock, TX (US)

(72) Inventors: David Thomas Schmidt, Round Rock, TX (US); Elie Antoun Jreij, Pflugerville, TX (US); Arieh Don, Newton, MA (US)

(73) Assignee: Dell Products, L.P., Round Rock, TX (US)

( * ) Notice: Subject to any disclaimer, the term of this patent is extended or adjusted under 35 U.S.C. 154(b) by 42 days.

(21) Appl. No.: 15/883,343

(22) Filed: Jan. 30, 2018

(65) Prior Publication Data

US 2019/0238628 A1    Aug. 1, 2019

(51) Int. Cl.
*H04L 29/08* (2006.01)
*G06F 13/42* (2006.01)

(52) U.S. Cl.
CPC ........ *H04L 67/1002* (2013.01); *G06F 13/426* (2013.01); *G06F 13/4221* (2013.01); *H04L 67/1097* (2013.01); *G06F 2213/0008* (2013.01); *G06F 2213/0036* (2013.01)

(58) Field of Classification Search
None
See application file for complete search history.

(56) References Cited

U.S. PATENT DOCUMENTS

| | | | |
|---|---|---|---|
| 6,711,574 B1* | 3/2004 | Todd | G06F 3/0611 |
| 2008/0005288 A1* | 1/2008 | Kodama | G06F 11/2069 |
| | | | 709/220 |
| 2008/0028143 A1* | 1/2008 | Murase | G06F 3/0613 |
| | | | 711/114 |
| 2008/0133851 A1* | 6/2008 | Miyazaki | G06F 3/0605 |
| | | | 711/154 |
| 2010/0191925 A1* | 7/2010 | Blount | G06F 12/0866 |
| | | | 711/160 |
| 2010/0205287 A1* | 8/2010 | Lopez | G06Q 10/00 |
| | | | 709/223 |
| 2013/0173930 A1* | 7/2013 | Obligacion | G06F 3/0632 |
| | | | 713/193 |
| 2016/0307168 A1* | 10/2016 | Aneja | G06Q 10/20 |
| 2017/0220476 A1* | 8/2017 | Qi | G06F 12/0888 |
| 2019/0087182 A1* | 3/2019 | Thomas | G06F 9/3017 |

* cited by examiner

*Primary Examiner* — Joshua Joo
(74) *Attorney, Agent, or Firm* — Fogarty LLP

(57) ABSTRACT

Systems and methods for managing a production server using a storage array. In an illustrative, non-limiting embodiment, a storage array may include a memory coupled to a processor, the memory having program instructions configured to cause and/or enable the storage array to: receive hardware information from a multipath input/output (MPIO) module of each of a plurality of production servers in communication with the storage array; provide the hardware information to a management server in communication with the storage array; receive a command from the management server targeting a selected production server; and transmit the command to a selected MPIO module of the selected production server.

15 Claims, 3 Drawing Sheets

PRODUCTION SERVER MANAGEMENT USING A STORAGE ARRAY

FIELD

The present disclosure generally relates to Information Handling Systems (IHSs), and, more particularly, to systems and methods for managing a production server using a storage array.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

SUMMARY

Embodiments of systems and methods for managing a production server using a storage array are described. In an illustrative, non-limiting embodiment, a storage array may include a memory coupled to a processor, the memory having program instructions configured to cause the storage array to: receive hardware information from a multipath input/output (MPIO) module of each of a plurality of production servers in communication with the storage array; provide the hardware information to a management server in communication with the storage array; receive a command from the management server targeting a selected production server; and transmit the command to a selected MPIO module of the selected production server In some cases, in each production server, the hardware information may be obtained by an MPIO user-space component of the MPIO module configured to communicate with a Baseband Management Controller (BMC). Moreover, in each production server, the hardware information may be received by an MPIO kernel-space component of the MPIO module coupled to the MPIO user-space component.

In various implementations, communications between the production servers and the storage array may be over an Internet Protocol (IP) network, and communications between the storage array and the management server may be over a Fiber Channel Protocol (FCP) network.

The hardware information may be obtained in response to a Small Computer System Interface (SCSI) command sent to the storage array by the management server. For example, the SCSI command may be a vendor-specific SCSI command. The SCSI command may be pulled from the storage array at predetermined time intervals by a MPIO kernel-space component of an MPIO module in a production server corresponding to the hardware information.

Moreover, the hardware information may indicate that a production server has a defective part, and the SCSI command may indicate to a user of the production server that the defective part is being replaced. First hardware information of a first production server may indicate a first manufacturer, the storage array may be configured to send the first hardware information to a first management server associated with the first manufacturer, second hardware information of a second production server may indicate a second manufacturer, and the storage array may be configured to send the second hardware information to a second management server associated with the second manufacturer.

In another illustrative, non-limiting embodiment, a method may implement one or more of the aforementioned operations. In yet another illustrative, non-limiting embodiment, a hardware memory device may have program instructions stored thereon that, upon execution by a storage array, cause the storage array to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Conventional server management platforms include: (i) a centralized server management console or station, and (ii) agent modules deployed on each of a plurality of managed production servers. In some cases, each agent may send its respective managed production server's status to a centralized server management console after a credential exchange. Conversely, a centralized server management console may connect to each of its managed production server to get their status, also requiring a credential exchange.

Moreover, server management consoles, which again have all credentials of all managed production servers, often communicate with their own backend servers (e.g., a manufacturer's customer service system) to report errors and the like, therefore presenting significant security risks, particularly in large-scale enterprises.

For example, with a conventional system, if an intruder hacks his way into the management server (e.g., using the external connection the management server has to a manufacturer's backend server) the intruder may then acquire all the credentials to the production servers. Such an intruder may then reach into those credentials to steal information or otherwise negatively impact the enterprise environment.

To address these, and other problems, systems and methods are described herein for managing production servers using storage arrays.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
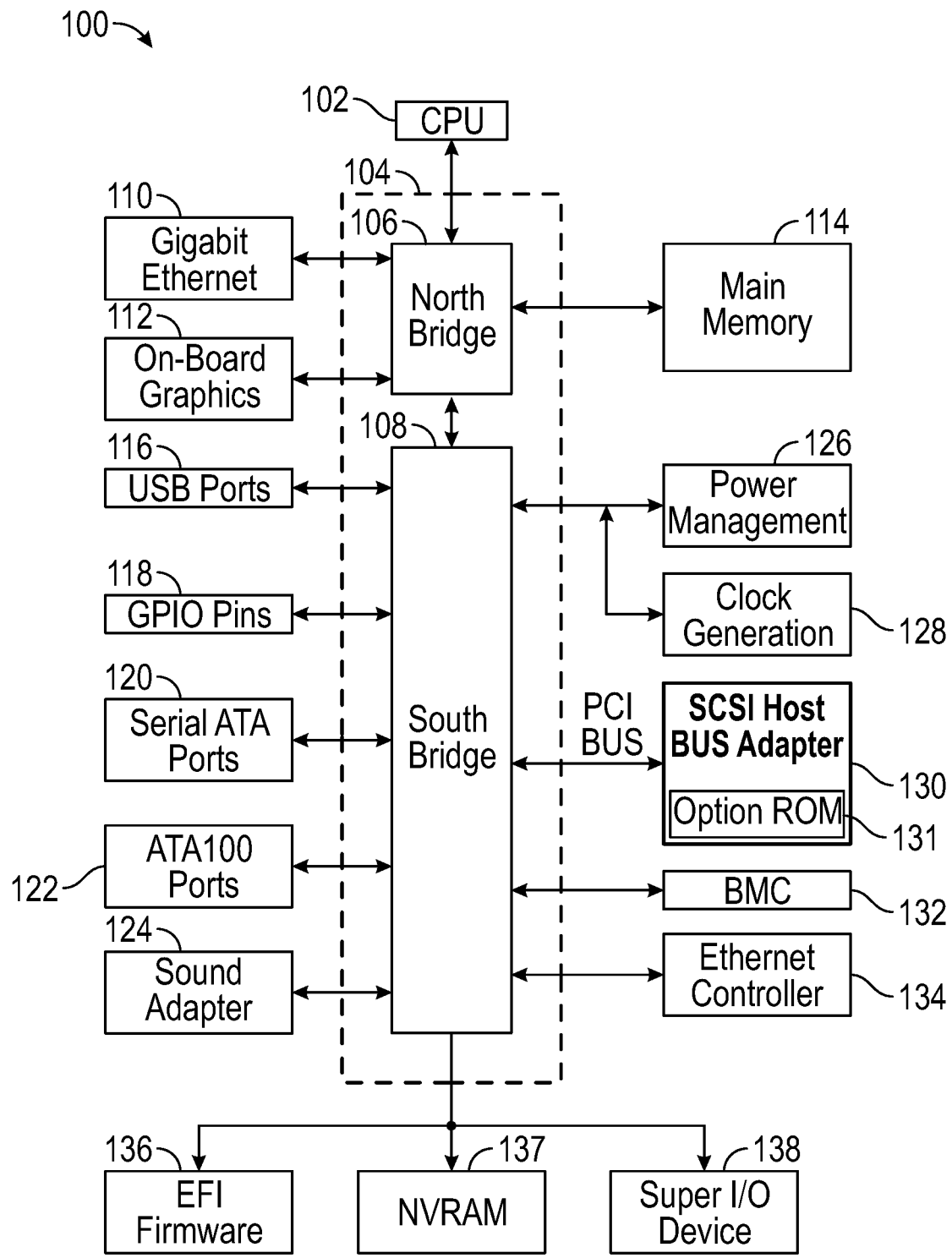
FIG. 1 is a block diagram of an example of an Information Handling System (IHS) configured to implement systems and methods according to some embodiments.

FIG. 1 shows an example of an IHS configured to implement systems and methods described herein. It should be appreciated that although certain embodiments described herein may be discussed in the context of a desktop or server computer, other embodiments may be utilized with virtually any type of IHS.

Particularly, the IHS includes a system planar, baseboard, or motherboard 100, which is a printed circuit board (PCB) to which components or devices are mounted to by way of a bus or other electrical communication path. In some cases, CPU 102 operates in conjunction with a chipset 104. CPU 102 may comprise a processor that performs arithmetic and logic necessary for the operation of the IHS.

Chipset 104 includes northbridge 106 and southbridge 108. Northbridge 106 provides an interface between CPU 102 and the remainder of the IHS. Northbridge 106 also provides an interface to a random access memory (RAM) used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the input/output (I/O) operations of the IHS. In particular, southbridge 108 may provide one or more universal serial bus (USB) ports 116, sound adapter 124, Ethernet controller 134, and one or more general purpose input/output (GPIO) pins 118. Southbridge 108 may further provide a Peripheral Component Interconnect Express (PCIe) bus for interfacing interfacing peripheral card devices such as BIOS boot system-compliant SCSI host bus adapter 130 with option ROM 131, which may serve as an interface between the IHS and a serial-attached SCSI (SAS) array, a Network-Attached Storage (NAS), and/or a Storage Area Network (SAN), for example.

In some embodiments, southbridge 108 may also provide baseboard management controller (BMC) 132 for use in managing the various components of the IHS. Power management circuitry 126 and clock generation circuitry 128 may also be utilized during operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS and allocation of resources. An application program is software that runs on top of the OS and uses computer resources made available through the OS to perform application-specific tasks desired by the user.

Mass storage devices may be connected to southbridge 108, such that their associated computer-readable media provide non-volatile storage for the IHS. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the Extensible Firmware Interface (EFI) Specification and Framework.

The LPC interface may also be utilized to connect NVRAM 137 to the IHS. NVRAM 137 may be utilized by BIOS/firmware 136 to store configuration data for the IHS. In other embodiments, configuration data for the IHS may be stored on the same NVRAM 137 as BIOS/firmware 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

Figure 2:
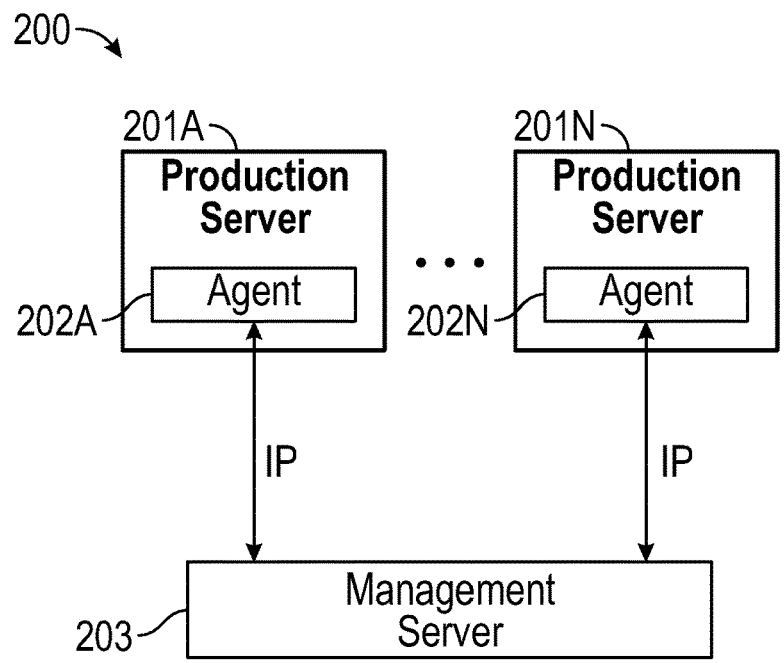
FIG. 2 is a block diagram of a conventional system for managing production servers.

FIG. 2 is a block diagram of a conventional system for managing production servers. In this case, each of production servers 201A-N includes a respective software agent 202A-N. Management sever 203 is in communication with production servers 201A-N via Internet Protocol (IP) connections. For example, production servers 201A-N may be IHSs used by enterprise users, and therefore each of production servers 201A-N may provide a user-space where data processing operations are performed during the regular course of business.

Management sever 203 is yet another IHS configured to discover, monitor, manage, patch, and deploy to production servers 201A-N (it may also monitor networking and storage conditions), such that an administrator can view the status of all of their servers and manage them from a single workstation.

In some implementations, production servers 201A-N may be PowerEdge IHSs: agents 202A-N may OpenManage Server Administrator (OMSA) software agents; and management server 203 may be configured to execute OpenManage console—all from DELL EMC—although, in other implementations, other components may be used.

Generally, management server receives hardware information for each of production servers 201A-N from their respective software agents 202A-N. Examples of hardware information include, by is not limited to, CPU, RAM, MAC address, serial number, service tag, and/or warranty information. The hardware information is provided to agents 202A-N by a respective BMC 132 of FIG. 1. In some cases, BMC 132 may be implemented as an integrated Dell Remote Access Controller (iDRAC), also from DELL EMC, which may be configured to provision, deploy, service, customize, patch, and update production servers 201A-N via agents 202A-N.

In most cases, management server 203 exchanges credentials (e.g., username and password, encryption keys, etc.) with software agents 202A-N over an Internet Protocol (IP) link or network prior to reporting hardware information to management sever 203. Moreover, management server 203, which again has all credentials of all managed production servers 201A-N, often communicates with backend servers (not shown) to report errors or the like, thus subjecting the entire enterprise to security vulnerabilities.

Still referring to FIG. 2, all elements shown may be present at a customer's site. In some cases, however, a backend server may be located outside the customer site (e.g., a hardware manufacturer's site), such that communications between management sever 203 and the backend server requires an open IP communication from the management sever 203 in the customer site to the outside—the hardware manufacturer's site. Attacks may happen through this external, backend server, where intruders may use this open channel to get behind the customer firewall and into the management server, and from there to production servers 201A-N.

Figure 3:
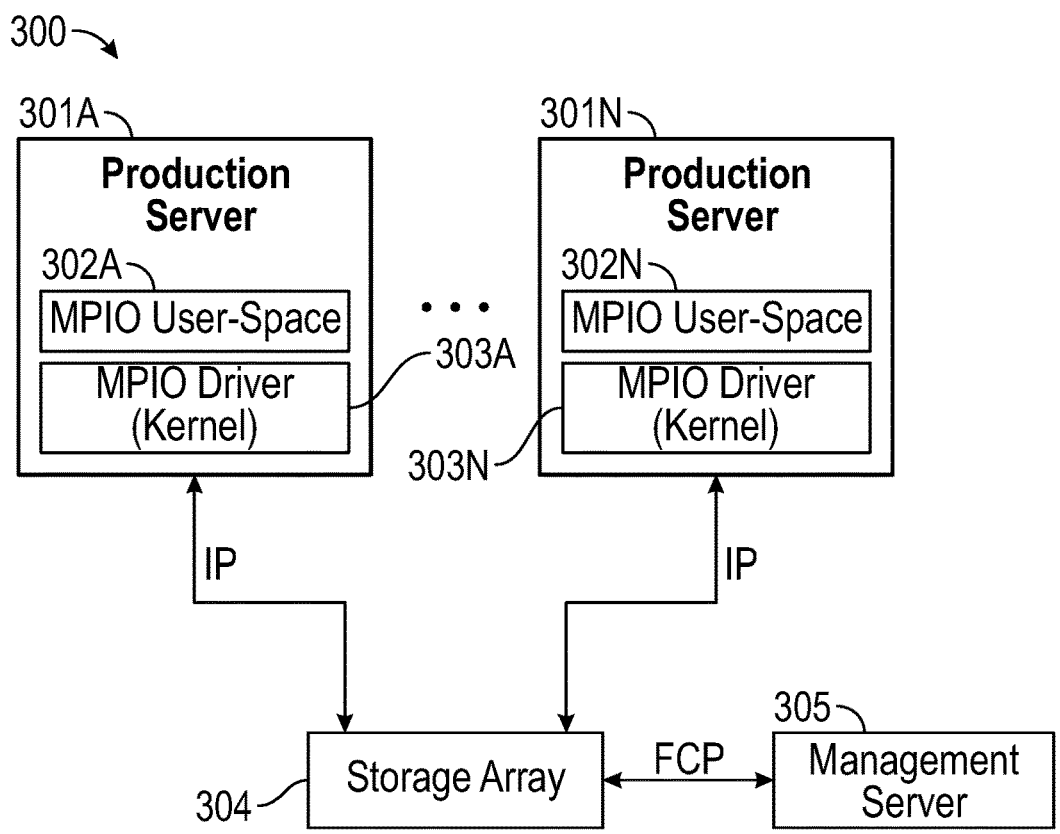
FIG. 3 is a block diagram of an example of a system for managing production servers using a storage array according to some embodiments.

In sharp contrast with the system of FIG. 2, the new system of FIG. 3 may be used for managing production servers using a storage array. In various embodiments, system 300 illustrates a new paradigm, whereby multipath I/O (MPIO) components 302A-N and 303A-N obtain hardware information from production servers 301A-N and communicate that information to storage array 304. Storage array 304 receives the hardware information, without the need for additional credential exchanges, and securely communicates it to management server 305 over a fiber optic channel or the like.

In many cases, MPIO components 302A-N and 303A-N eliminate or reduce the need for credential exchanges for purposes of sending hardware information between production servers 301A-N and storage array 304. Storage array 304 may further transmit the hardware information to management server 305 suing a secure Fiber Cable Protocol (FCP). Management server 305 may communicate with production servers 301A-N in the reverse direction, for example, by issuing vendor-specific SCSI commands to storage array 304. These commands may be pushed to, or polled by, MPIO kernel components or drivers 303A-N.

As used herein, MPIO refers to a framework configured to mitigate the effects of a host bus adapter (HBA) or network card failure by providing an alternate data path between storage devices and an OS. MPIO uses redundant physical path components, such as adapters, cables, and network switches, to create logical paths between production server 301A, for example, and storage array 304. In the event that one or more of these components fails, multipathing uses alternate paths for I/O so that applications can still operate.

MPIO components in production server 301A, for example, are sub-divided into user-space or "userland" component 302A and MPIO kernel driver or component 303A. In some cases, an OS being executed by production server 301A may segregate its memory into kernel space and user-space; to provide memory protection and hardware protection from malicious behavior. Kernel space is strictly reserved for running a privileged OS kernel, kernel extensions, and most device drivers, including MPIO kernel driver 303A. Conversely, user-space is the memory area where application software executes, including MPIO user-space component 302A.

Figure 4:
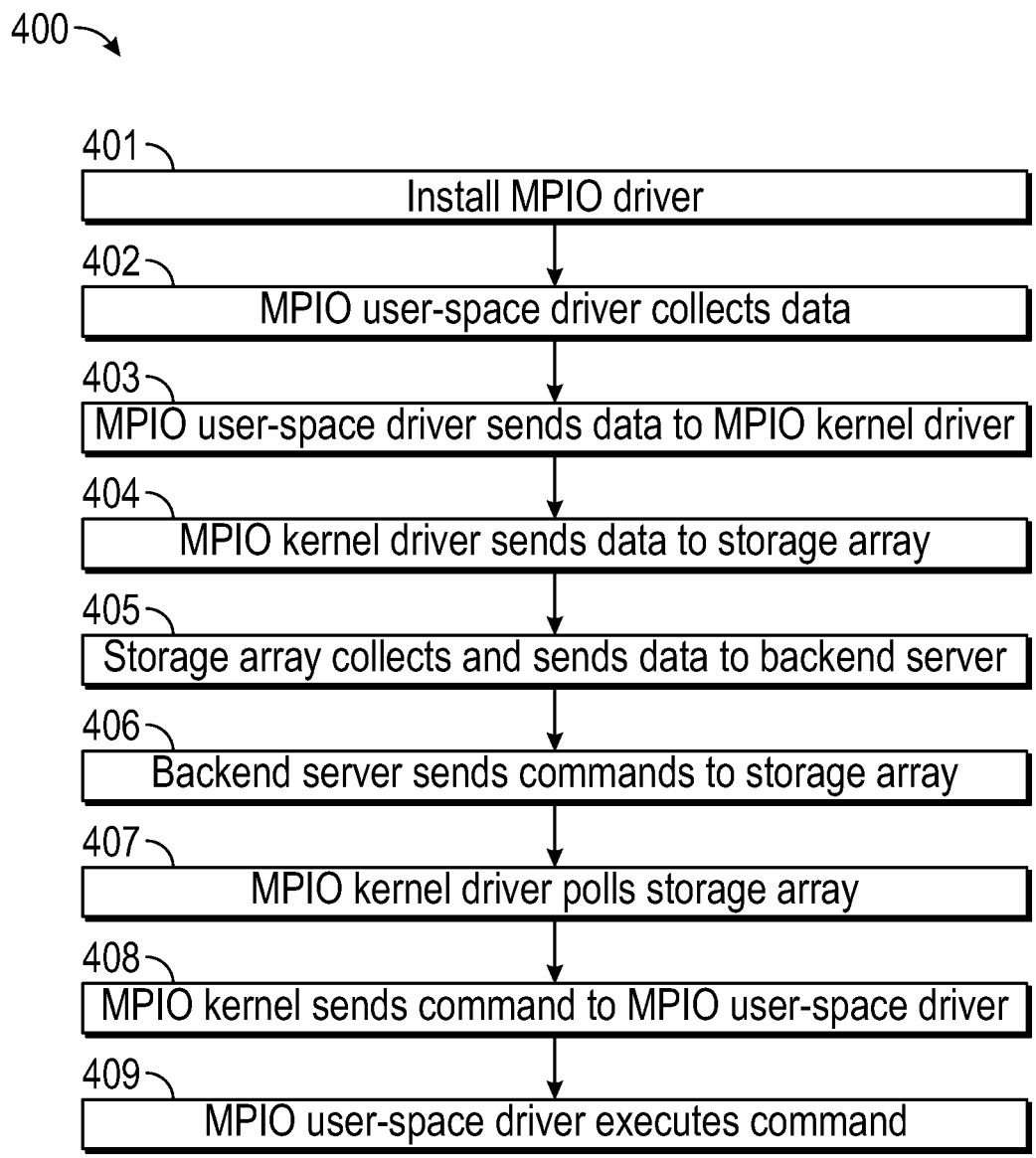
FIG. 4 is a flowchart of an example of a method for managing production servers using a storage array according to some embodiments.

FIG. 4 is a flowchart of an example of a method for managing production servers using a storage array according to some embodiments. At block 401, method 400 includes installing an MPIO system in a production server. At block 402, the installed MPIO user-space component 302A collects hardware data, for instance, from BMC 132 (e.g., a service tag, CPU or memory status, etc.). At block 403, MPIO user-space component 302A sends the hardware data to MPIO kernel driver 303A.

Although in this case MPIO kernel driver 303A receives data from MPIO user-space component 302A, it should be noted that, in many situations, MPIO kernel driver 303A may also directly access host performance information related to I/O operations. For instance, MPIO kernel driver 303A may receive average I/O queue length indicating I/O load on the host, as well as other real-time information from the storage array, to help solve performance issues indicated as host performance issues that are in fact problems with the storage array, etc.

At block 404, MPIO kernel driver 303A sends data to storage array 304. At block 405, storage array 304 collects data from all production servers and sends the collected hardware information to management or backend server 305. At block 406, management server 305 sends commands (e.g., vendor-specific or custom SCSI commands) to storage array 304, in response to the hardware information, where the commands are stored in a buffer or the like.

At block 407, MPIO kernel driver 303A polls and receives pending commands from storage array 304 that are directed to production server 301A, for example. In many cases, these commands may be exclusive of conventional MPIO routing instructions; and may instead contain server management instructions. For example, hardware information coming from production server 301A may indicate that the production server has a defective part, and the vendor-specific, SCSI command issued from management server 305 to production server 301A may indicate that the defective part is being replaced or shipped to the user.

In some cases, first hardware information of a first production server may identify a first manufacturer, and the storage array may send the first hardware information to a first management server associated with the first manufacturer to then receive a first SCSI command following a first vendor-specific format. Concurrently, second hardware information of a second production server may identify a second manufacturer, the storage array may send the second hardware information to a second management server (or the first management server), and a second SCSI command may follow a second vendor-specific format.

At block 408, MPIO kernel component 303A sends the polled command(s) to MPIO user-space component 302A. Then, at block 409, MPIO user-space component 302A executes the command(s).

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A storage array, comprising:
    a processor; and
    a memory coupled to the processor, the memory having program instructions stored thereon that, upon execution, cause the storage array to:
        receive a Small Computer System Interface (SCSI) command from a management server;
        in response to the SCSI command, obtain hardware information from a multipath input/output (MPIO) module of each of a plurality of production servers in communication with the storage array, wherein the hardware information indicates that a selected production server has a defective part;
        provide the hardware information to the management server;
        receive another SCSI command from the management server targeting the selected production server, wherein the other SCSI command indicates that the defective part is being replaced; and
        transmit the other SCSI command to a selected MPIO module of the selected production server.

2. The storage array of claim 1, wherein, in each production server, the hardware information is obtained by an MPIO user-space component of the MPIO module configured to communicate with a Baseband Management Controller (BMC).

3. The storage array of claim 2, wherein, in each production server, the hardware information is received by an MPIO kernel-space component of the MPIO module coupled to the MPIO user-space component.

4. The storage array of claim 1, wherein communications between the production servers and the storage array are over an Internet Protocol (IP) network, and wherein communications between the storage array and the management server are over a Fiber Channel Protocol (FCP) network.

5. The storage array of claim 1, wherein the other SCSI command is a vendor-specific SCSI command.

6. The storage array of claim 1, wherein SCSI commands are pulled from the storage array at predetermined time intervals by an MPIO kernel-space component of an MPIO module in the selected production server.

7. The storage array of claim 1, wherein first hardware information of a first production server indicates a first manufacturer, wherein the storage array is configured to send the first hardware information to a first management server associated with the first manufacturer, wherein second hardware information of a second production server indicates a second manufacturer, and wherein the storage array is configured to send the second hardware information to a second management server associated with the second manufacturer.

8. A hardware memory device having program instructions stored thereon that, upon execution by a storage array, cause the storage array to:
    receive a Small Computer System Interface (SCSI) command from a management server;
    in response to the SCSI command, obtain hardware information from a multipath input/output (MPIO) module of each of a plurality of production servers in communication with the storage array;

provide the hardware information to the management server in communication with the storage array;

receive a vendor-specific SCSI command from the management server targeting a selected production server; and transmit the vendor-specific SCSI command to a selected MPIO module of the selected production server, wherein SCSI commands are pulled from the storage array at predetermined time intervals by an MPIO kernel-space component of an MPIO module in the selected production server.

9. The hardware memory device of claim 8, wherein, in each production server, the hardware information is obtained by an MPIO user-space component of the MPIO module configured to communicate with a Baseband Management Controller (BMC).

10. The hardware memory device of claim 9, wherein, in each production server, the hardware information is received by an MPIO kernel-space component of the MPIO module coupled to the MPIO user-space component.

11. The hardware memory device of claim 8, wherein communications between the production servers and the storage array are over an Internet Protocol (IP) network, and wherein communications between the storage array and the management server are over a Fiber Channel Protocol (FCP) network.

12. The hardware memory device of claim 8, wherein the hardware information indicates that the selected production server has a defective part.

13. In a storage array, a method comprising:

receiving hardware information from a multipath input/output (MPIO) module of each of a plurality of production servers in communication with the storage array, wherein the hardware information indicates that a selected production server has a defective part;

providing the hardware information to a management server;

receiving a vendor-specific SCSI command from the management server targeting the selected production server; and transmitting the vendor-specific SCSI command to a selected MPIO module of the selected production server, wherein SCSI commands are pulled from the storage array at predetermined time intervals by an MPIO kernel-space component of an MPIO module in the selected production server.

14. The method of claim 13, wherein, in each production server, the hardware information is obtained by an MPIO user-space component of the MPIO module configured to communicate with a Baseband Management Controller (BMC).

15. The method of claim 14, wherein, in each production server, the hardware information is received by an MPIO kernel-space component of the MPIO module coupled to the MPIO user-space component.

* * * * *